United States Patent
Cui et al.

(10) Patent No.: US 12,117,409 B1
(45) Date of Patent: Oct. 15, 2024

(54) DURABILITY TEST METHOD, DEVICE AND SYSTEM OF PHASE CHANGE MATERIAL

(71) Applicant: Shenzhen University, Guangdong (CN)

(72) Inventors: Hongzhi Cui, Guangdong (CN); Xiangpeng Cao, Guangdong (CN); Lele Cao, Guangdong (CN); Haibin Yang, Guangdong (CN); Feng Yu, Guangdong (CN)

(73) Assignee: Shenzhen University, Guangdong (CN)

( * ) Notice: Subject to any disclaimer, the term of this patent is extended or adjusted under 35 U.S.C. 154(b) by 0 days.

(21) Appl. No.: 18/606,092

(22) Filed: Mar. 15, 2024

(30) Foreign Application Priority Data

Jun. 2, 2023 (CN) .......................... 202310649860.7

(51) Int. Cl.
  *G01N 25/02* (2006.01)
(52) U.S. Cl.
  CPC .................... *G01N 25/02* (2013.01)
(58) Field of Classification Search
  CPC .................................................. G01N 250/02
  See application file for complete search history.

(56) References Cited

FOREIGN PATENT DOCUMENTS

| CN | 110595991 A | * | 12/2019 | |
|---|---|---|---|---|
| CN | 114460132 A | * | 5/2022 | ............. G01N 25/02 |
| CN | 114705715 A | * | 7/2022 | |

OTHER PUBLICATIONS

Translation of CN110595991A (Year: 2019).*

* cited by examiner

*Primary Examiner* — Mirellys Jagan
(74) *Attorney, Agent, or Firm* — Cooper Legal Group, LLC

(57) ABSTRACT

A durability test method a phase change material includes: placing a material to be tested in a solid-liquid combination test component for detecting the material to be tested, and executing a preset centrifugal rotation detection control scheme; performing cycling control on a temperature regulation semiconductor provided on the solid-liquid combination test component according to a preset temperature single-cycle regulation scheme; obtaining a temperature detection information of the material to be tested; and analyzing and processing the temperature detection information of the material to be tested to generate a durability information of the material to be tested according to a preset durability analysis method of the material to be tested.

6 Claims, 14 Drawing Sheets

DURABILITY TEST METHOD, DEVICE AND SYSTEM OF PHASE CHANGE MATERIAL

CROSS-REFERENCE TO RELATED APPLICATION

This application claims the priority and benefit of Chinese patent application serial no. 202310649860.7, filed on Jun. 2, 2023. The entirety of Chinese patent application serial no. 202310649860.7 is hereby incorporated by reference herein and made a part of this specification.

TECHNICAL FIELD

The present application relates to a field of a phase change material test technology, and in particular, to a durability test method, device and system of a phase change material.

BACKGROUND ART

A phase change material is a substance converted among two or three states, that is, solid, liquid or gas, when the temperature is constant and supplied a latent heat. Therefore, the phase change material is generally used in situations such as heat storage, cold storage and energy recovery and utilization and so on.

In existing technologies, the phase change material can be a single or composite material. With an increase of usage frequency of solid-liquid phase, the composite material may suffer from a material segregation/delamination, due to which storage ability is reduced or phase temperature is changed, thereby causing that the phase change material to lose its effect. Therefore, during research and development process of the phase change material, it is necessary to detect thermal physical properties and durability of the phase change material. Conventional test processes generally accurately control the temperature at a certain temperature by using a temperature cycling box, and detects the durability of the phase change material by temperature cycling test.

There are some disadvantages in above existing technologies: in liquid state of the composite phase change material, different components are easy to be subjected to segregation due to different density, which would lead to delamination phenomenon. When the temperature cycling box is used to perform durability test, a cycling process time is too long and a test speed is slow, thereby easily leading to decreased accuracy of a detection result of the phase material durability. Therefore, there is still some space for improvement.

SUMMARY

For the purpose of improving an accuracy of a detection result of a phase change material durability, a durability test method, device and system of the phase change material of the present application is disclosed.

In a first aspect, a durability test method of the phase change material according to the present application adopts following solution:

a durability test method of a phase change material, including:
placing a material to be tested in a solid-liquid combination test component for detecting the material to be tested, and executing a preset centrifugal rotation detection control scheme;
performing cycling control on a temperature regulation semiconductor provided on the solid-liquid combination test component according to a preset temperature single-cycle regulation scheme;
obtaining a temperature detection information of the material to be tested; and
analyzing and processing the temperature detection information of the material to be tested to generate a durability information of the material to be tested according to a preset durability analysis method of the material to be tested.

By adopting above solution, the solid-liquid combination test component rotates the material to be tested and generates a centrifugal force by executing the centrifugal rotation detection control scheme, thereby improving a speed of the durability detection of the material to be tested. The detection temperature of the material to be tested is quickly changed by controlling the temperature regulation semiconductor, thereby improving detection speed, which finally meets a goal of improving an accuracy of the detection result of the phase change material durability.

Optionally, the single temperature single-cycle regulation scheme includes:
obtaining a temperature regulation baseline curve information;
retrieving a initial regulation temperature value, a final regulation temperature value, an electrical duty ratio information and an electrical control frequency information corresponding to the temperature regulation baseline curve information according to the temperature regulation baseline curve information, and sending to the temperature regulation semiconductor;
obtaining a regulation temperature detection value at real time;
analyzing and obtaining a regulation temperature correction information corresponding to the regulation temperature detection value and a regulation temperature baseline value, and sending the regulation temperature correction information to the temperature regulation semiconductor according to a corresponding relationship among the regulation temperature detection value, a preset regulation temperature baseline value and a preset regulation temperature correction information;
By adopting above solution, the temperature regulation baseline curve information is acquired, and the initial regulation temperature value, the final regulation temperature value, the electrical duty ratio information and the electrical control frequency information corresponding to the temperature regulation baseline curve information are retrieved, such that the temperature regulation semiconductor retrieves the temperature of the material to be tested. The regulation temperature detection value is obtained at real time, the regulation temperature correction information is analyzed and obtained via the regulation temperature detection value and the regulation temperature baseline value, and the regulation temperature correction information is sent to the temperature regulation semiconductor, such that the temperature regulation semiconductor can accurately regulate the temperature of the material to be tested, thereby improving the accuracy of the detection result of the phase change material durability.

Optionally, the specific steps after sending the regulation temperature corrected information to the temperature regulation semiconductor are as follows:
analyzing and calculating a difference between the initial regulation temperature value and the final regulation temperature value as a regulation temperature variation value according to the initial regulation temperature value and the final regulation temperature value; and judging whether the regulation temperature variation value is a positive value;

if the regulation temperature variation value is a positive value, outputting a preset auxiliary heating control information into an auxiliary heating component provided on the solid-liquid combination test component; or if the regulation temperature variation value is not a positive value, continuously sending the regulation temperature correction information to the temperature regulation semiconductor.

By adopting above solution, the difference between the initial regulation temperature value and the final regulation temperature value is analyzed and calculated, and is used as the regulation temperature variation value. Whether the regulation temperature variation value is a positive value is judged, so that, when the difference is a positive value, the preset auxiliary heating control information is outputted into the auxiliary heating component provided on the solid-liquid combination test component, thereby accelerating for regulating the temperature of the material to be tested.

Optionally, the specific steps after continuously sending the regulation temperature correction information to the temperature regulation semiconductor are as follows:

obtaining a current time point;

analyzing and processing the current time point and the temperature regulation baseline curve information according to the preset temperature prediction method to generate a baseline time temperature prediction value; and analyzing and obtaining a pre-cooling control information corresponding to the baseline time temperature prediction value, and sending the pre-cooling control information to a cooling fan provided on the temperature regulation semiconductor according to a corresponding relationship between the baseline time temperature prediction value and the preset pre-cooling control information.

By adopting above solution, the current time point is obtained, the current time point and the temperature regulation baseline curve information are analyzed and processed to generate the baseline time temperature prediction value by the temperature prediction method, the pre-cooling control information is analyzed and obtained by the baseline time temperature prediction value, and the pre-cooling control information is sent to the cooling fan provided on the temperature regulation semiconductor, so as to control the cooling fan to cool the temperature regulation semiconductor in advance, thereby improving work efficiency of the temperature regulation semiconductor.

Optionally, the temperature detection information of the material to be tested is analyzed and processed to generate the durability information of the material to be tested according to the preset durability analysis method of the material to be tested, including:

judging whether a single temperature single-cycle regulation scheme has been executed;

if the single temperature single-cycle regulation scheme has been executed, analyzing and processing the regulation temperature detection value to generate the regulation temperature detection curve information according to a preset temperature curve confirmation method;

analyzing and processing a regulation temperature detection curve information to generate a regulation temperature current power storage value according to a preset regulation temperature current power storage value analysis method;

analyzing and obtaining a final deterioration speed value corresponding to the regulation temperature current power storage value, and regarding the final deterioration speed value as the durability information of the material to be tested according to a corresponding relationship between the regulation temperature current power storage value and the preset final deterioration speed value; or if the single temperature single-cycle regulation scheme has not been executed, continuously executing the single temperature single-cycle regulation scheme;

By adopting above solution, by judging whether the single temperature single-cycle regulation scheme has been executed, when the single temperature single-cycle regulation scheme has been executed, the regulation temperature detection value is analyzed and processed to generate the regulation temperature detection curve information by the temperature curve confirmation method, the regulation temperature detection curve information is analyzed and processed to generate the regulation temperature current power storage value by the regulation temperature present power storage analysis method, and the final deterioration speed value is analyzed and obtained by the regulation temperature current power storage value and regarded as the durability information of the material to be tested, or when the single temperature single-cycle regulation scheme has not been executed, the single temperature single-cycle regulation method is continuously executed, so as to obtain the final deterioration speed value, thereby improving the accuracy of an obtained final deterioration speed value.

Optionally, the final deterioration speed value corresponding to the regulation temperature current power storage value is analyzed and obtained according to a corresponding relationship between the regulation temperature current power storage value and the preset final deterioration speed value, including:

judging whether it is first time to obtain the regulation temperature current power storage value;

if it is first time to obtain the regulation temperature current power storage value, regarding the regulation temperature current power storage value as a regulation temperature initial power storage value;

re executing the single temperature single-cycle regulation scheme; or if it is not first time to obtain the regulation temperature current power storage value, analyzing and processing the regulation temperature current power storage value according to a preset deterioration ratio value determination method to generate a deterioration ratio value;

analyzing and processing the deterioration ratio value to generate a current deterioration speed value according to a preset deterioration speed value confirmation method, and regarding the current deterioration speed value as a final deterioration speed value.

By adopting above solution, by judging whether it is first time to obtain the regulation temperature current power storage value, when it is first time to obtain the regulation temperature present power, the regulation temperature current power storage value is regarded as the regulation temperature initial power storage value, and the single temperature single-cycle regulation scheme is re-executed, or when it is not first time to obtain the temperature present power storage value, the regulation temperature current power storage value is analyzed and processed to generate the deterioration ratio value by the deterioration ratio value determination method, the deterioration ratio value is analyzed and processed to generate the current deterioration speed value by the deterioration speed value confirmation method, and the current deterioration speed value is regarded as the final deterioration speed value, thereby improving the accuracy of the obtained final deterioration speed value.

Optionally, the deterioration ratio value is analyzed and processed to generate the current deterioration speed value according to the preset deterioration speed value confirmation method, including:

judging whether the current deterioration speed value is smaller than a preset deterioration speed baseline value;

if the current deterioration speed value is smaller than the preset deterioration speed baseline value, continuously outputting the current deterioration speed value; or if the current deterioration speed value is not smaller than the preset deterioration speed baseline value, re executing the single temperature single cycle regulation scheme.

By adopting above solution, by judging whether the current deterioration speed value is smaller than the preset deterioration speed baseline value, when the current deterioration speed value is smaller than the preset deterioration speed baseline value, the current deterioration speed value is continuously outputted, or when the current deterioration speed value is not smaller than the preset deterioration speed baseline value, the single temperature single-cycle control method is re-executed, thereby improving the accuracy of the obtained final deterioration speed value.

Optionally, the specific steps after obtaining the temperature detection information of the material to be tested and before analyzing and processing the temperature detection information of the material to be tested to generate the durability information of the material to be tested according to the preset durability analysis method of the material to be tested are as follows:

obtaining a state detection information of the material to be tested; and judging whether the state detection information of the material to be tested has a preset segregation state information;

if the state detection information of the material to be tested has a preset segregation state information, outputting and adding a preset centrifugal rotation speed-increasing adjustment information to a centrifugal rotation detection control scheme to generate a new centrifugal rotation detection control scheme; or if the state detection information of the material to be tested does not have a preset segregation state information, analyzing and processing the temperature detection information of the material to be tested according to the preset durability analysis method of the material to be tested to generate the durability information of the material to be tested.

By adopting above solution, the state detection information of the material to be tested is obtained, and whether the state detection information of the material to be tested has the preset segregation state information is judged. When the state detection information of the material to be tested has the preset segregation state information, the centrifugal rotation speed-increasing adjustment information is outputted and added to the centrifugal rotation detection control scheme, or when the state detection information of the material to be tested does not have the preset segregation state information, the temperature detection information of the material to be tested is analyzed and processed to generate the durability information by the durability analysis method of the material to be tested, so as to adjust the centrifugal rotation when the material to be tested has a segregation state, and accelerate the layering of the material, thereby improving test efficiency of the durability.

In the second aspects, a test device of the phase change durability according to the present application adopts following solution:

the test device of the phase change material durability, including a solid-liquid combination test component configured to detect the material to be tested, a driving assembly configured to rotate the solid-liquid combination test component, and a temperature regulation semiconductor configured to regulate a temperature of the material to be tested, wherein the solid-liquid combination test component includes a heat conduction solid and a heat conduction liquid.

By adopting above solution, the driving assembly rotates the solid-liquid combination test component, the heat of the solid-liquid combination test component is regulated by the temperature regulation semiconductor, thereby improving the detection speed, which finally meets a goal of improving the accuracy of the detection result of the durability of the phase change material.

In the third aspects, a test system of the phase change material durability according to the present application adopts following solution:

the test method of the phase change material durability, including:

an obtaining module configured to obtain a temperature detection information, a temperature regulation baseline curve information, a regulation temperature detection value, a current time point and a state detection information of a material to be tested;

a storage configured to store any one of program of the test method of the phase change material durability in the first aspect; and a processor configured to load with and execute the program in the storage and accomplish any one of the test method of the phase change material durability in the first aspect.

By adopting above solution, the temperature detection information of the material to be tested, the temperature regulation baseline curve information, the regulation temperature detection value, the current time point and the state detection information of the material to be tested is obtained by the obtaining module, and the program in the storage is loaded with and executed by the processor, thereby improving the detection speed, and further improving the accuracy of the detection result of the phase change material durability.

In summary, the present application has at least one of the following beneficial technical effects:

1. the solid-liquid combination test component rotates the material to be tested and generates a centrifugal force by executing the centrifugal rotation detection control scheme, thereby improving a speed for detecting the durability of the material to be tested, and the detection temperature of the material to be tested is quickly changed by controlling the temperature regulation semiconductor, thereby improving the detection speed, which finally meets a goal of improving an accuracy of the detection result of the phase change material durability;

2. the temperature regulation baseline curve information is obtained, and the initial regulation temperature value, the final regulation temperature value, the electrical duty ratio information and the electrical control frequency information corresponding to the temperature regulation baseline curve information is retrieved, such that the temperature regulation semiconductor retrieves the temperature of the material to be tested. The regulation temperature detection value is obtained at present, the regulation temperature correction information is analyzed and obtained via the regulation temperature detection value and the regulation temperature baseline value, and the regulation temperature correction information is sent to the temperature regulation semiconductor, such that the temperature regulation semiconductor can accurately regulate the temperature of the material to be tested, thereby improving the accuracy of the detection result of the phase change material durability; and 3. the difference between the initial regulation temperature value and the final regulation temperature value is analyzed and calculated, the difference is regarded as the regulation temperature variation value, then whether the regulation temperature variation value is a positive value is judged, when the difference is a positive value, the preset auxiliary heating control information is outputted into the auxiliary heating component provided on the solid-liquid combination test component, thereby accelerating for regulating the temperature of the material to be tested.

BRIEF DESCRIPTION OF THE DRAWINGS

In FIG. 6, Te indicates a temperature change curve of a detection groove; TO indicates a temperature curve of the phase change material under Te in an initial stage; T1, T2, T3 indicate temperature regulation detection curves detected and formed by temperature sensors at different positions after a durability test, respectively; Tb indicates a temperature at time t0; and Ta indicates a temperature at time t1.

DETAILED DESCRIPTION

In order to make the purpose and the solution of present application more clear, the present application is further described in details below in combination with FIGS. 1-13. It should be understood that, the specific embodiments described herein are only provided for explaining the present application, not intended to limit the present application.

A test method of a phase change material durability according to embodiments in the present application is disclosed.

Figure 1:
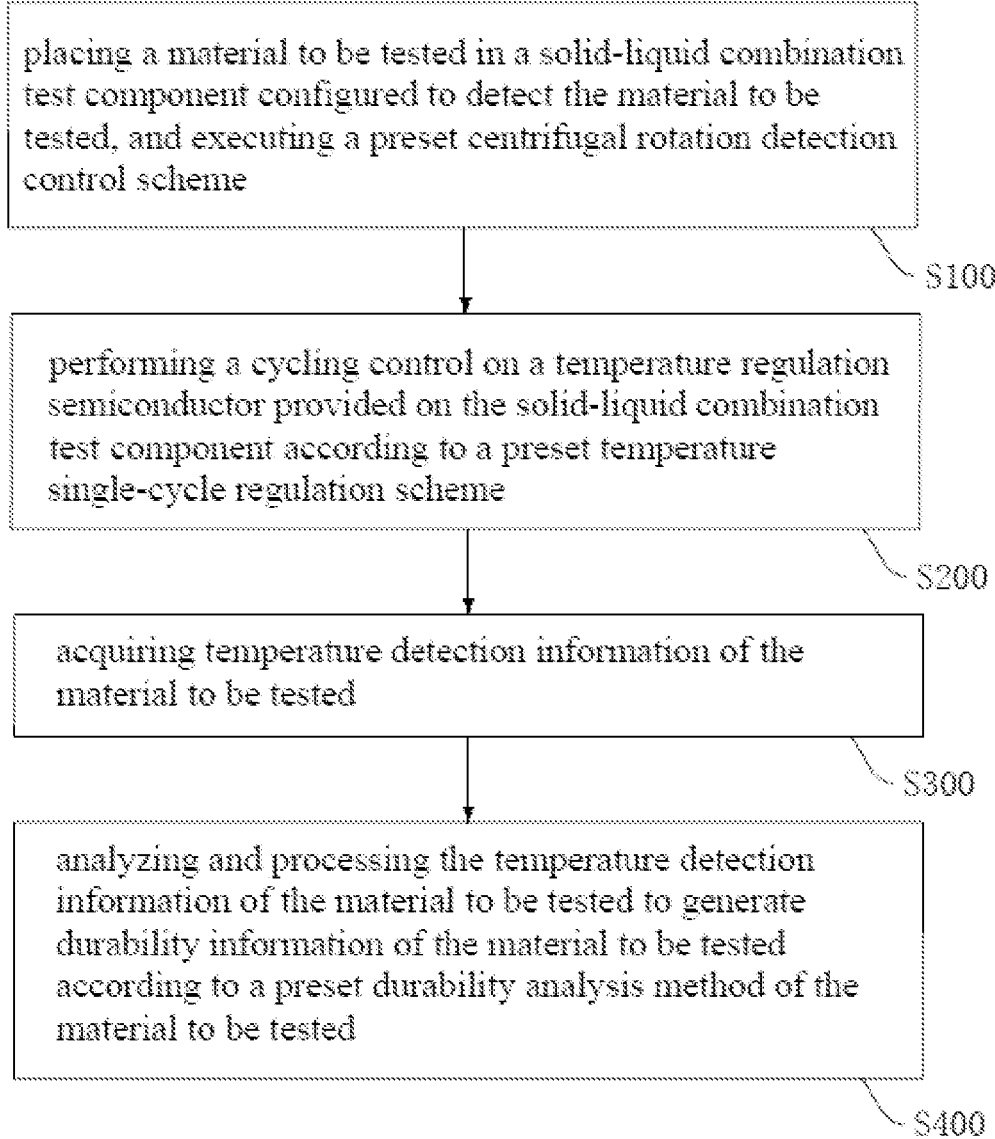
FIG. 1 is a method flow chart of a phase change material durability according to an embodiment in the present application.

Referring to FIG. 1, a test method of a phase change material durability includes:

step 100, a material to be tested 1 is placed in a solid-liquid combination test component 2 configured to detect the material to be tested 1 and a preset centrifugal rotation detection control scheme is executed.

In particular, the material to be tested 1 is a phase change material, the durability of which is needed to be tested. The solid-liquid combination test component 2 is a test component configured to test the durability of the material to be tested 1 by the solid-liquid combination. The centrifugal rotation detection control scheme is a control scheme used for controlling the solid-liquid combination test component 2 to rotate and supplying a centrifugal force to the material to be tested 1, and is retrieved from a database in which the centrifugal rotation detection control schemes are stored.

The material to be tested 1 is placed in a solid-liquid combination test component 2 and the preset centrifugal rotation detection control scheme is executed, so as to start to test the durability of the material to be tested 1.

Step 200, a temperature regulation semiconductor 4 provided on the solid-liquid combination test component 2 is circularly controlled according to a preset temperature single-cycle regulation scheme.

In particular, the temperature single-cycle control scheme is a test temperature scheme of the single cycle used for regulating the material to be tested 1 to process the durability detection, and the temperature single-cycle regulation scheme is retrieved from a database in which the temperature single-cycle regulation schemes are stored.

The temperature regulation semiconductor 4 is circularly controlled by the temperature single regulation scheme, such that the temperature regulation semiconductor 4 can quickly change the test temperature when the material to be tested 1 is subjected to the durability detection test, thereby improving the detection speed, which finally meets the goal of improving the accuracy of the detection result of the phase change material durability.

Step 300, a temperature detection information of the material to be tested 1 is obtained.

In particular, the temperature detection information of the material to be tested 1 is a real-time temperature detection information of the material to be tested 1, and is obtained by using a temperature sensor provided on the solid-liquid combination test component 2 or on the material to be tested 1 in advance. Obtaining the temperature detection information of the material to be tested 1 facilitates the use of the temperature detection information of the material to be tested 1.

Step 400, the temperature detection information of the material to be tested 1 is analyzed and processed to generate a durability information of the material to be tested 1 according to a preset durability analysis method of the material to be tested 1.

In particular, the durability analysis method of the material to be tested 1 is an analysis method used to detect the durability of the material to be tested 1, which is retrieved from the database in which the durability analysis methods of the material to be tested 1 are stored.

The durability information of the material to be tested 1 is a detection result information of the durability of the material to be tested 1. The temperature detection information of the material to be tested 1 is analyzed and processed according to a preset durability analysis method of the material to be tested 1 to generate a durability information of the material to be tested 1, which is convenient to obtain the detection result of the phase change material durability that the accuracy of the detection result had been improved.

Figure 2:
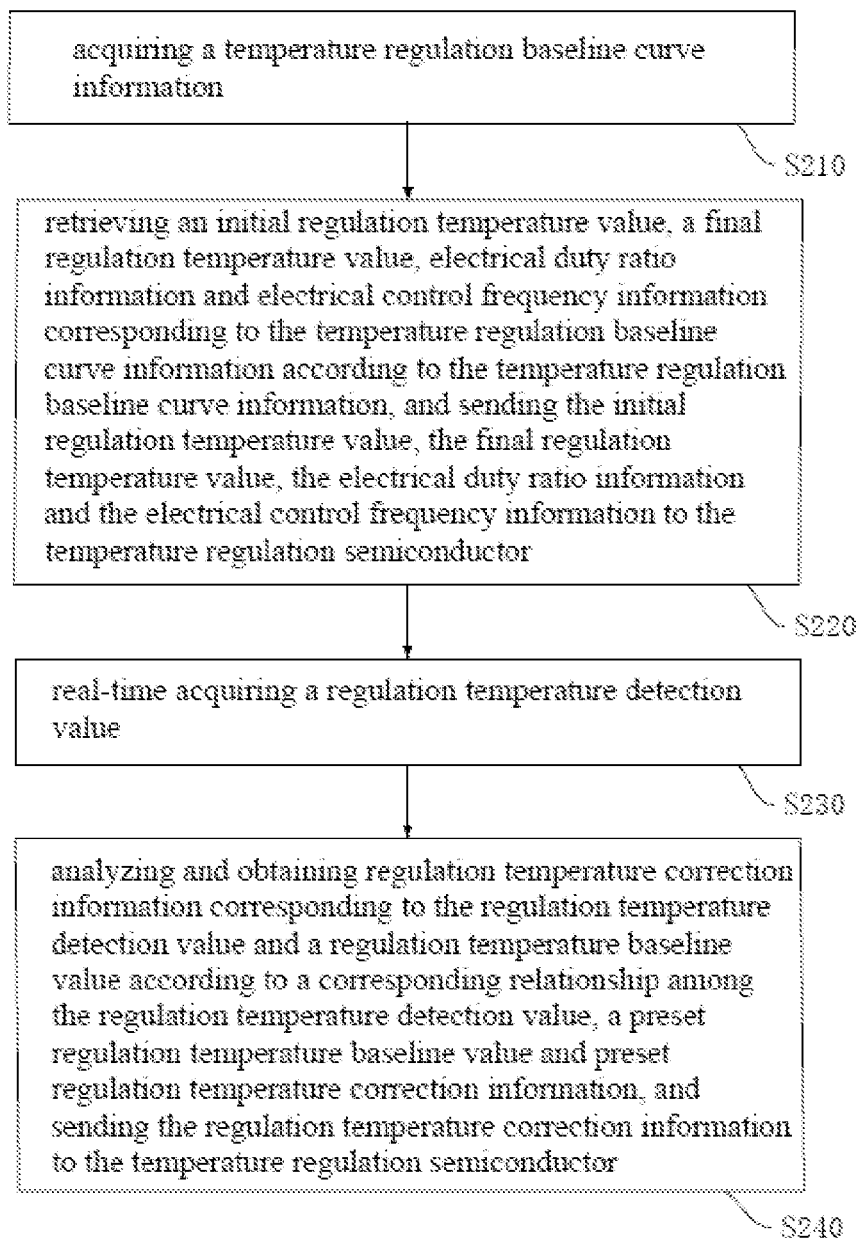
FIG. 2 is a method flow chart of a single temperature single-cycle regulation scheme according to an embodiment in the present application.

In step 200 shown in FIG. 1, in order to further ensure a rationality of the temperature single-cycle regulation scheme, it is necessary to further make separate analysis and calculation on the temperature single regulation scheme, which is described in details in the step shown in FIG. 2.

Referring to FIG. 2, the temperature single-cycle regulation scheme includes following steps:

Step 210, a temperature regulation baseline curve information is obtained.

In particular, the temperature regulation baseline curve information is a baseline temperature change curve information used to regulate the test temperature in a single cycle when the material to be tested 1 is subjected to the durability detection test. The temperature regulation baseline curve information is obtained by operator input.

Step 220, an initial regulation temperature value, a final regulation temperature value, an electrical duty ratio information and an electrical control frequency information corresponding to the temperature regulation baseline curve information is retrieved according to the temperature regulation baseline curve information, and sent to the temperature regulation semiconductor 4.

In particular, the initial regulation temperature value is a primary temperature value when the test temperature is regulated, which is searched for and obtained from a database stored with the initial regulation temperature value. The final regulation temperature value is a final regulation temperature value when the test temperature is regulated, which can be retrieved from a database stored the final regulation temperature value. The electrical duty ratio information is a regulation information used to regulate the electrical duty ratio when the temperature regulation semiconductor 4 is controlled to work, which is searched for and obtained from a database stored with the electrical duty ratio information. The electrical control frequency information is a regulation information used to regulate the electrical frequency when the temperature regulation semiconductor 4 is controlled to work, which is searched for and obtained from a database stored with the electrical control frequency information.

The initial regulation temperature value, the final regulation temperature value, the electrical duty ratio information and the electrical control frequency information corresponding to the temperature regulation baseline curve information are retrieved, and sent to the temperature regulation semiconductor 4, so as to control the temperature regulation semiconductor 4 to change the test temperature from the initial regulation temperature value according to a parameter change corresponding to the electrical duty ratio information and the electrical control frequency information to the final regulation temperature value, which is convenient to subsequently detect the durability of the material to be tested 1.

step 230, a regulation temperature detection value is obtained at real time;

In particular, the regulation temperature detection value is a detection value used to detect the test temperature at present, and detected and obtained by the temperature sensor provided on the solid-liquid combination test component 2.

step 240, a regulation temperature correction information corresponding to the regulation temperature detection value and a regulation temperature baseline value is analyzed and obtained according to a corresponding relationship among the regulation temperature detection value, a preset regulation temperature baseline value and a preset regulation temperature corrected information, and sent to the temperature regulation semiconductor 4.

In particular, the regulation temperature baseline value is a baseline temperature value at which the test temperature is regulated at a time corresponding to the regulation temperature detection value, and searched for and obtained after the temperature regulation baseline curve information and the time corresponding to the regulation temperature detection value are retrieved.

The regulation temperature correction information is a correction value used to process the temperature correction when the test temperature is retrieved, which is searched for and obtained from a database stored with the regulation temperature correction information. The regulation temperature correction information is analyzed and obtained by the regulation temperature detection value and the regulation temperature baseline value, and sent to the temperature regulation semiconductor 4, so as to control the temperature regulation semiconductor 4 to correct the test temperature at a real time, such that the test temperature reaches a requirement temperature when the material to be tested 1 is subjected to the durability detection test.

Figure 3:
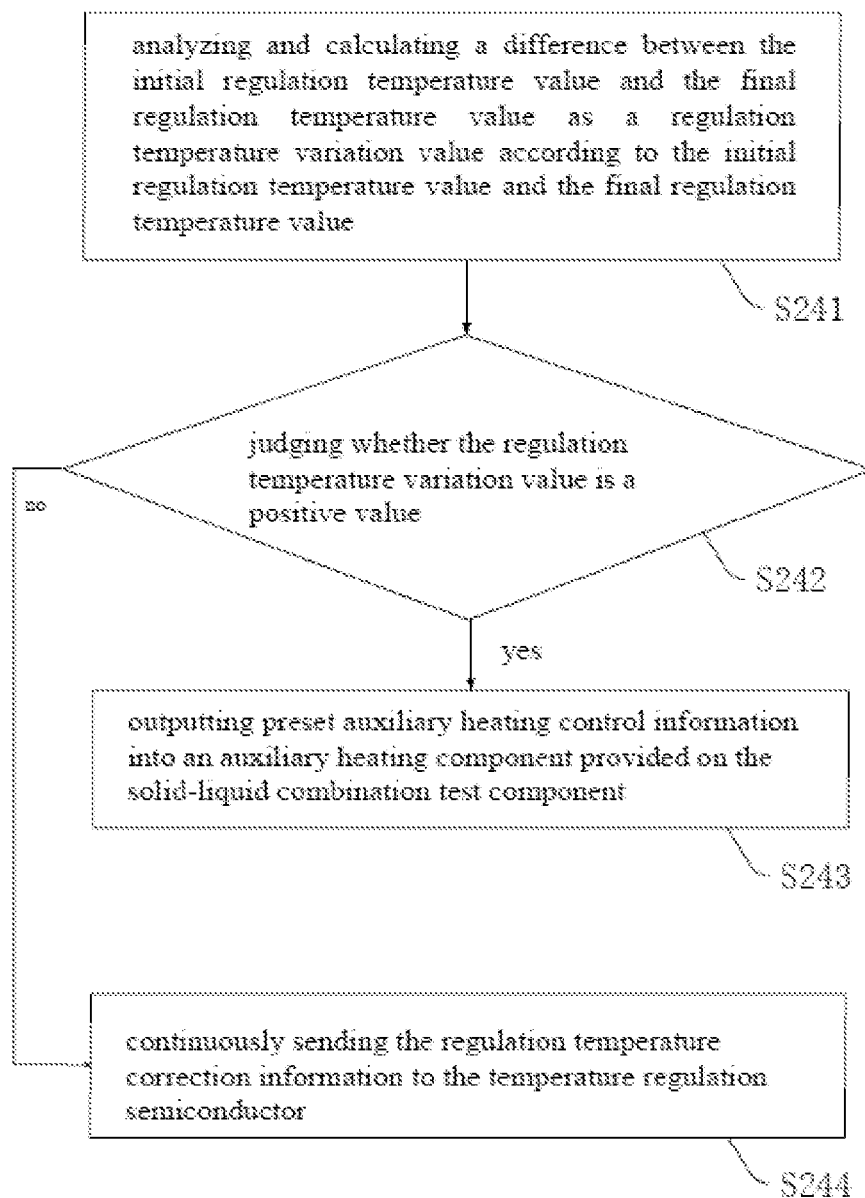
FIG. 3 is a method flow chart of steps after sending a regulation temperature correction information to a temperature regulation semiconductor according to an embodiment in the present application.

In step 240 shown in FIG. 2, in order to further ensure a rationality for sending the regulation temperature correction information to the temperature regulation semiconductor 4, it is necessary to make further separate analysis and calculation after the regulation temperature correction information is sent to the temperature regulation semiconductor 4, as described in details in the step shown in FIG. 3.

Referring to FIG. 3, steps after sending the regulation temperature correction information to the temperature regulation semiconductor 4 includes following steps:

Step 241, a difference between the initial regulation temperature value and the final regulation temperature value is analyzed and calculated as a regulation temperature variation value according to the initial regulation temperature value and the final regulation temperature value.

In particular, the regulation temperature variation value is a variation value of a single cycle test temperature when the regulation material to be tested 1 is subjected to the durability detection test.

The difference between the initial regulation temperature value and the final regulation temperature value is analyzed and calculated by regulating the initial regulation temperature value and the final regulation temperature value, and regarded as the regulation temperature variation value, which is convenient to subsequently use the regulation temperature variation value.

step 242, whether the regulation temperature variation value is a positive value is judged. If the regulation temperature variation value is the positive value, the step 243 is executed; or if the regulation temperature variation value is not the positive value, the step 244 is executed.

In particular, determining whether the regulation temperature variation value is a positive value can judge whether the test temperature is in a state needed to be heated or be cooled.

Step 243, a preset auxiliary heating control information is outputted into an auxiliary heating component provided on the solid-liquid combination test component 2.

In particular, the auxiliary heating control information is a control information used to control the auxiliary heating component to process an auxiliary heating, which is searched for and obtained from a database stored with the auxiliary heating information.

When the regulation temperature variation value is the positive value, it means that the present test temperature is in the state needed to be heated. Therefore, the auxiliary heating control information is outputted into the auxiliary heating component, thereby increasing a heating speed.

Step 244, the regulation temperature correction information is continuously sent to the temperature regulation semiconductor 4.

In particular, when the regulation temperature variation value is not the positive value, it means that the present test temperature is in the state needed to be cooled. Therefore, the regulation temperature correction information is continuously sent to the temperature regulation semiconductor 4, thereby continuously controlling the temperature regulation semiconductor 4 to regulate the cool state for the test temperature.

Figure 4:
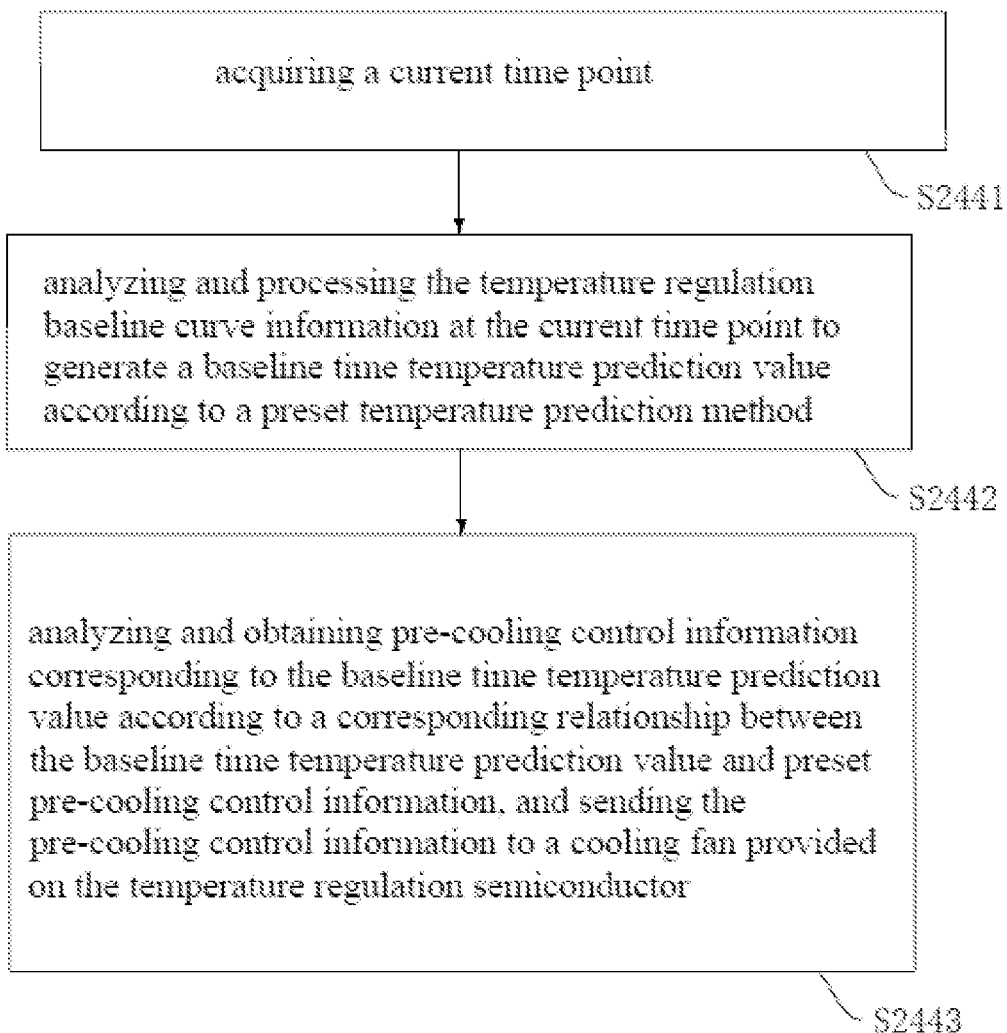
FIG. 4 is a method flow chart of steps after continuously sending the regulation temperature correction information to the temperature regulation semiconductor according to an embodiment in the present application.

In step 244 shown in FIG. 3, in order to further ensure the rationality that the regulation temperature correction information is sent to the temperature regulation semiconductor 4, it is necessary to make further separate and calculation after the regulation temperature correction information is sent to the temperature regulation semiconductor 4, as described in details in the step shown in FIG. 4.

Referring to FIG. 4, the step after the regulation temperature correction information is continuously sent to the temperature regulation semiconductor 4 includes following steps:

Step 2411, a current time point is obtained.

In particular, the current time point is a current time point when the regulation temperature correction information is sent to the temperature regulation semiconductor 4. The current time point is searched for and obtained from a database when the regulation temperature correction information is sent to the temperature regulation semiconductor 4.

Step 2442, the current time point and the temperature regulation baseline curve information is analyzed and processed to generate a baseline time temperature prediction value according to a preset temperature prediction method.

In particular, the temperature prediction method is a method used to predict the temperature after the baseline time, which is searched for and obtained from a database stored with the temperature prediction method.

The baseline time temperature prediction value is a temperature prediction value after the current time passes the baseline time. The current time point and the temperature regulation baseline curve information are analyzed and processed according to the temperature prediction method to generate a baseline time temperature prediction value, which is convenient to subsequently use the baseline time temperature prediction value.

Step 2443, a pre-cooling control information corresponding to the baseline time temperature prediction value is analyzed and obtained according to the corresponding relationship between the baseline time temperature prediction value and the preset pre-cooling control information, and the preset pre-cooling control information is sent to a cooling fan 14 provided on the temperature regulation semiconductor 4.

In particular, the pre-cooling control information is a control information used to control the cooling fan 14 to work and perform a pre-cooling treatment, which is searched for and obtained from a database stored with the pre-cooling control information.

The pre-cooling control information is analyzed and obtained by the baseline time temperature prediction value, and sent to the cooling fan 14, so as to control the cooling fan 14 to cool the temperature regulation semiconductor 4 in advance, thereby improving a work efficiency of the temperature regulation semiconductor 4.

Figure 5:
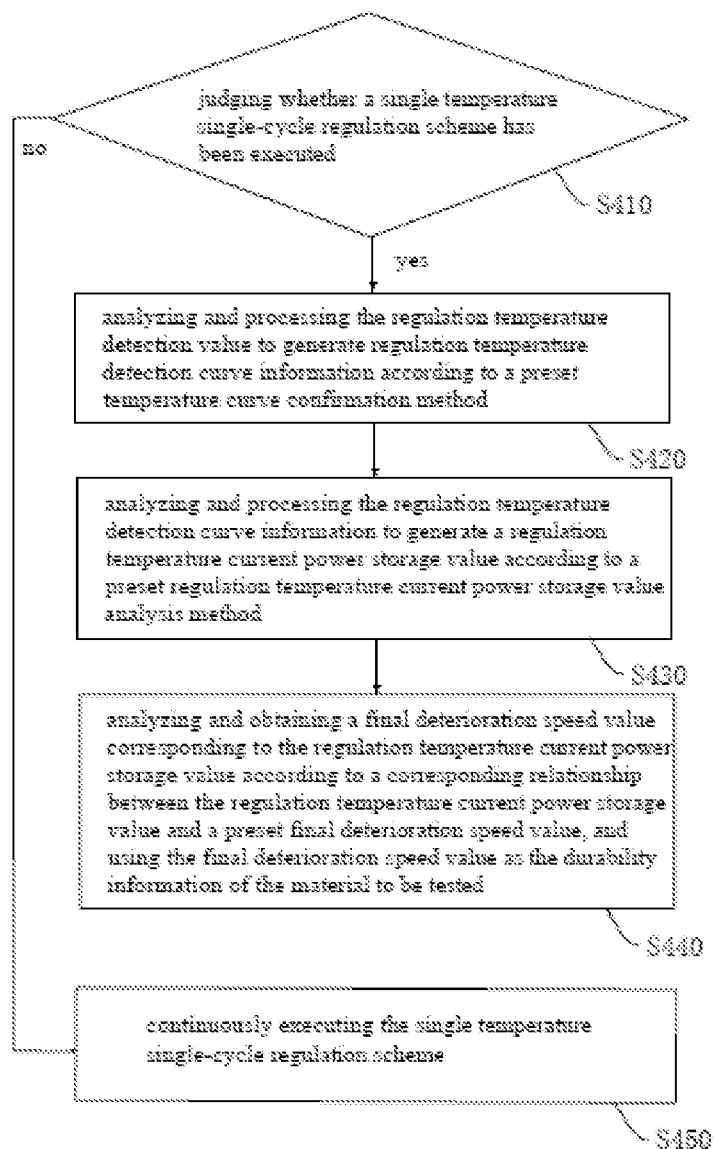
FIG. 5 is a method flow chart of a temperature detection information of the material to be tested analyzed and processed to generate a durability information of the material to be tested according to a preset durability analysis method of the material to be tested, according to an embodiment in the present application.
Figure 6:
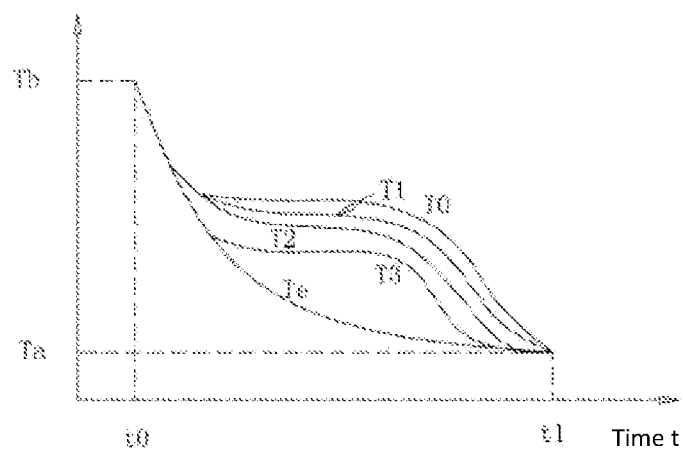
FIG. 6 is a schematic view of a test temperature change curve and time according to an embodiment in the present application.

In step 400 shown in FIG. 1, in order to further ensure a rationality of the durability information of the material to be tested 1, it is necessary to make further separate and calculation for the durability information of the material to be tested 1, as described in details in the step shown in FIG. 5.

Referring to FIG. 5, the temperature detection information of the material to be tested 1 is analyzed and processed to generate the durability information of the material to be tested 1 according to the preset durability analysis method of the material to be tested 1, including following steps:

step 410, whether to execute one single temperature single-cycle regulation scheme is judged. If the single temperature single-cycle regulation scheme has been executed, the step 420 is executed; or, if the temperature single-cycle regulation scheme has not been executed, the step 450 is executed.

In particular, whether to execute the single temperature single-cycle regulation scheme is judged, so as to judge whether a single cycle test of the material to be tested 1 is completed when the durability test is processed.

step 420, the regulation temperature detection value is analyzed and processed according to a preset temperature curve confirmation method to generate the regulation temperature detection curve information.

In particular, the temperature curve confirmation method is a method for confirming the test temperature change curve detected in the single cycle when the material to be tested 1 is subjected to the durability detection test, which is searched for and obtained from a database stored with the temperature curve confirmation methods. The regulation temperature detection curve information is a test temperature change curve information detected in the single cycle when the material to be tested 1 is subjected to the durability detection test.

When the single temperature single-cycle regulation scheme is executed, it means that the single cycle test is completed when the material to be tested 1 is subjected to the durability detection test at this time. Therefore, the regulation temperature detection value is analyzed and processed by the temperature curve confirmation method, thereby generating the regulation temperature detection curve information, which is convenient to subsequently use the regulation temperature detection curve information.

step 430, a regulation temperature detection curve information is analyzed and processed to generate a regulation temperature current power storage value according to the preset regulation temperature current power storage value analysis method.

In particular, the regulation temperature current power storage value analysis method is a method for analyzing the storage value of the present power after the test temperature is regulated, which is searched for and obtained from a database stored with the regulation temperature current power storage value analysis method. The regulation temperature current power storage value is a storage value of the present power after the test temperature is regulated.

The regulation temperature detection curve information is analyzed and processed according to the preset regulation temperature current power storage value analysis method to generate a regulation temperature current power storage value.

The regulation temperature current power storage value analysis method include a temperature-time area of the temperature regulation baseline curve obtained by integrating the temperature regulation baseline curve information over time, denoted as $$\int_{t0}^{t1} T(t),$$

a temperature-time area of the temperature regulation detection curve obtained by integrating the temperature regulation detection curve information over time, denoted as $$\int_{t0}^{t1} Te.$$

A difference between the temperature-time area of the temperature regulation baseline curve and the temperature-time area of the regulation temperature detection curve is analyzed and calculated as a temperature-time variation area value. When a formula of the temperature-time variation area value is adopted, the specification of which is as follows:

$$A' = \left| \int_{t0}^{t1} [T(t) - Te] \right|.$$

A' is a temperature-time variation area value;

T (t) is a temperature-time area of the temperature regulation baseline curve; and Te is a temperature-time area of the regulation temperature detection curve.

Then, the temperature-time variation area value during the temperature rise process is recorded as A'up (T), and the temperature-time variation area value during the temperature drop process is recorded as A'down (T). The total area value of the single-cycle temperature-time variation is calculated using the following formula: A (T)=A'up (T)+A'down (T). The total area value of the single-cycle temperature-time variation is used as the current energy storage value of the regulated temperature, which facilitates the subsequent use of the current energy storage value of the regulated temperature.

A plurality of temperature probes are provided along a gravity direction of the solid-liquid combination test component 2, and at this time, the regulation temperature current power storage value is a sum of the plurality of single cycle temperature change total area value. In the present embodiment, three temperature probes are provided along the gravity direction of the solid-liquid combination test component 2.

Step 440, a final deterioration speed value corresponding to the regulation temperature current power storage value is analyzed and obtained according to a corresponding relationship between the regulation temperature current power storage value and a preset final deterioration speed value, and used as the durability information of the material to be tested 1.

In particular, the final deterioration speed value is a final speed value that the performance is decreased to an uncovered state when the material to be tested 1 is subjected to the durability detection test, which is searched for and obtained from a database stored with the final deterioration speed value.

The final deterioration speed value is analyzed and obtained by the regulation temperature current power storage value, and regarded as a durability information of the material to be tested 1, thereby improving the accuracy of the durability information of the obtained material to be tested 1.

Step 450, the single temperature single-cycle regulation scheme is continuously executed.

In particular, when the single temperature-singe cycle regulation scheme has not been executed, it means that the test of the single cycle has not been completed when the material to be test 1 is subjected to the durability test, so as to continuously execute the single temperature-single cycle regulation scheme.

Figure 7:
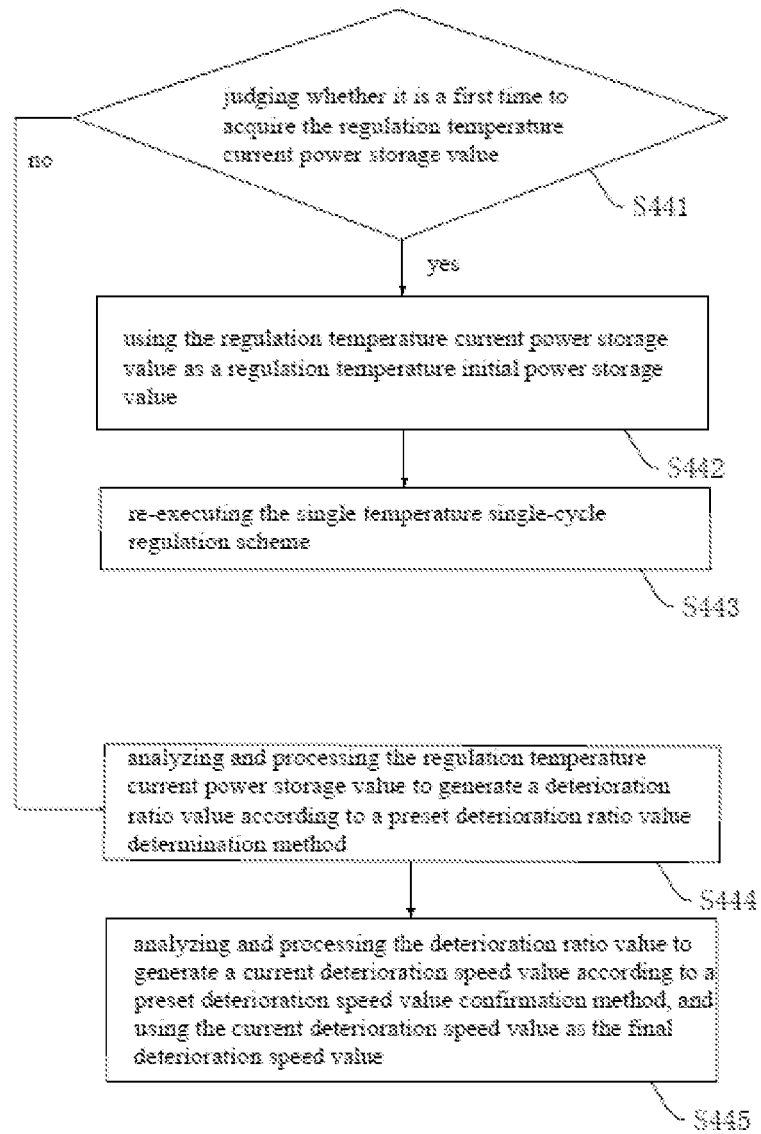
FIG. 7 is a method flow chart of a final deterioration speed value corresponding to the regulation temperature current power storage value analyzed and obtained according to a corresponding relationship between the regulation temperature current power storage value and the preset final deterioration speed value, according to an embodiment in the present application.

In step 440 shown in FIG. 5, in order to further ensure a rationality of the final deterioration speed value, it is necessary to make further separate and calculation for the final deterioration speed value, as described in details in the step shown in FIG. 7.

Referring to FIG. 7, the final deterioration speed value corresponding to the regulation temperature current power storage value is analyzed and obtained, according to a corresponding relationship between the regulation temperature current power storage value and the preset final deterioration speed value, including following steps:

Step 441, whether it is a first time to obtain the regulation temperature current power storage value is judged. If it is the first time to obtain the regulation temperature current power storage value, the step 442 is executed; or if it is not the first time to obtain the regulation temperature current power storage value, step 444 is executed.

In particular, it can be judged whether the single temperature single-cycle regulation scheme is completed for first time by judging whether the regulation temperature current power storage value is obtained for the first time.

Step 442, the regulation temperature current power storage value is a regulation temperature initial power storage value.

In particular, the regulation temperature initial power storage value is a storage value of the present power obtained for first time after the test temperature is regulated.

when it is first time to obtain the regulation temperature current power storage value, which means that it is first time to execute and complete the single temperature single-cycle regulation scheme, and the storage value obtained at present power is a primary power value of the material to be tested 1. Therefore, the regulation temperature current power storage value is regarded as the regulation temperature initial power storage value.

step 443, the single temperature single-cycle regulation scheme is re-executed.

In particular, the single temperature single-cycle regulation scheme is re-executed, so as to continuously detect the durability of the material to be tested 1.

Step 444, the regulation temperature current power storage value is analyzed and processed to generate a deterioration ratio value according to a preset deterioration ratio value determination method;

In particular, the deterioration ratio value is a ratio value that the power value of the material to be tested 1 occurs deterioration when the material to be tested 1 processes the durability detection, the deterioration ratio confirmation method is a method used to confirm the deterioration ratio value, which is searched for and obtained from a database stored with the deterioration ratio value determination method. The regulation temperature current power storage value is analyzed and obtained by the deterioration ratio value determination method, which needs to adopt a deterioration ratio calculation formula. The deterioration ratio calculation formula is as follows:

$$f(t) = 1 - \frac{\sum A(t)}{\text{MAX}(\sum A)},$$

so as to generate the deterioration ratio value, which is convenient to subsequently using the deterioration ratio value.

Step 445, the deterioration ratio value is analyzed and processed to generate a current deterioration speed value according to the preset deterioration speed value confirmation method, and regarded as a final deterioration speed value.

In particular, the current deterioration speed value is an actual speed value when the power value of the material to be tested 1 occurs deterioration at current time. The deterioration speed value confirmation method is a method used to analyze and confirm the current deterioration speed value, which is searched for and obtained from a database stored with the deterioration speed confirmation method.

The deterioration ratio value is analyzed and processed by the deterioration speed value, f (t) is a current deterioration speed value, and the current deterioration speed value is regarded as the final deterioration speed value by calculating the first-order derivative of the degradation ratio, thereby improving the accuracy of the obtained final deterioration speed value.

Figure 8:
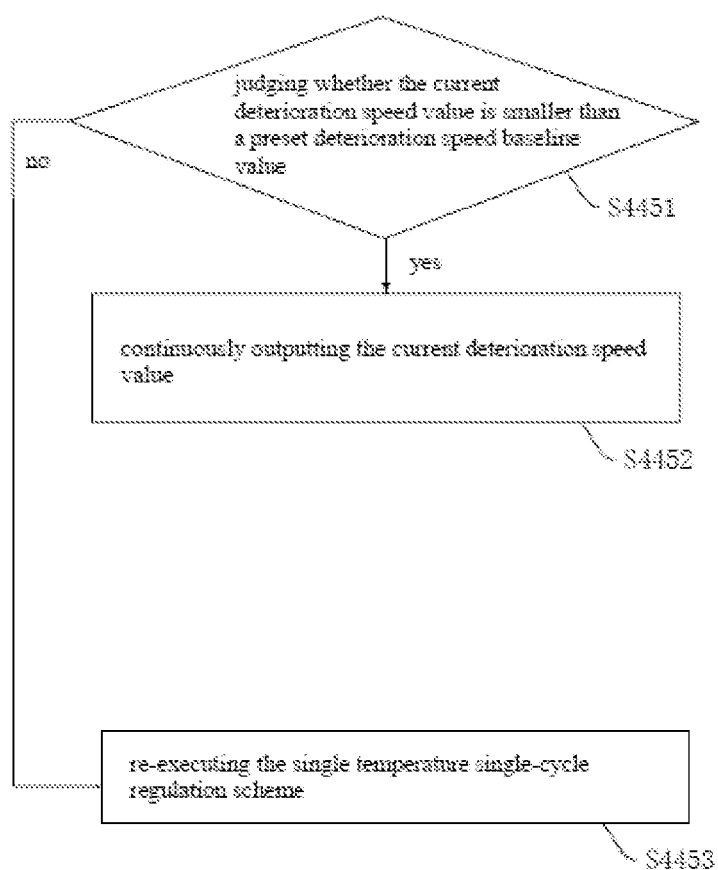
FIG. 8 is a method flow chart of a deterioration ratio value analyzed and processed to generate the current deterioration speed value according to the preset deterioration speed value confirmation method, according to an embodiment in the present application.

In step 445 shown in FIG. 7, in order to further ensure a rationality of the current deterioration speed value, it is necessary to make further separate and calculation for the deterioration speed value, as described in details in the step shown in FIG. 8.

Referring to FIG. 8, the deterioration ratio value is analyzed and processed to generate the current deterioration speed value according to the preset deterioration speed value confirmation method, including following steps:

Step 4451, whether the current deterioration speed value is smaller than a preset deterioration speed baseline value is judged. If the current deterioration speed value is smaller than the preset deterioration speed baseline value, the step 4452 is executed; or if the current deterioration speed value is not smaller than the preset deterioration speed baseline value, the step 4453 is executed.

In particular, the deterioration speed baseline is a baseline speed value for which deterioration occurs to the power value of the material to be tested 1 at current time, which is searched for and obtained from a database stored with deterioration speed baseline value.

It can be judged whether the power value of the material to be tested 1 is easy to continuously deteriorate at current time.

Step 4452, the current deterioration speed value is continuously outputted.

In particular, when the current deterioration speed value is smaller than the preset deterioration speed baseline value, it means that the power value of the material to be tested 1 is not easily to continuously deteriorate at current time. Therefore, the current deterioration speed value is continuously outputted, thereby improving the accuracy of the obtained current deterioration speed value.

Step 4453, step 443 is executed.

In particular, when the current deterioration speed value is not smaller than the preset deterioration speed baseline value, it means that the power value of the material to be tested 1 is easy to continuously deteriorate at current time. Therefore, the step 443 is executed. In the present application, the deterioration speed baseline value is 0.1.

Figure 9:
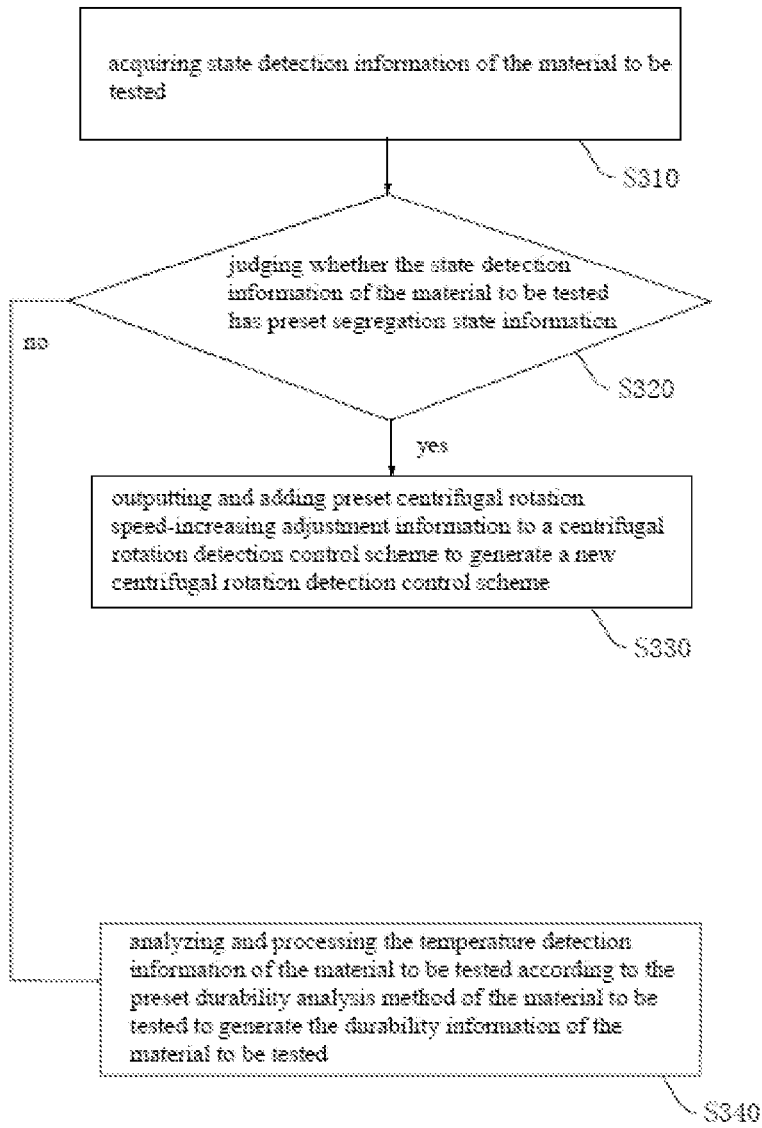
FIG. 9 is a method flow chart of steps after obtaining the temperature detection information of the material to be tested and before analyzing and processing the temperature detection information of the material to be tested to generate the durability information of the material to be tested according to the preset durability analysis method of the material to be tested, according to an embodiment in the present application.

After the step 300 and before step 400 shown in FIG. 1, in order to further ensure a rationality of the durability information of the material to be tested 1, it is necessary to make further separate and calculation for the durability information of the material to be tested 1, as described in details in the step shown in FIG. 9.

Referring to FIG. 9, after the temperature detection information of the material to be tested 1 is obtained, the step before the temperature detection information of the material to be tested 1 is analyzed and processed to generate the durability information of the material to be tested 1 according to the preset durability analysis method of the material to be tested 1, including following steps:

Step 310, a state detection information of the material to be tested 1 is obtained.

In particular, the state detection information of the material to be tested 1 is a state detection information of the material to be tested 1 at current time, and observed and obtained by an infrared camera provided on the solid-liquid combination test component 2.

Step 320, whether the state detection information of the material to be tested 1 has a preset segregation state information is judged. If the state detection information of the material to be tested 1 has the preset segregation state information, step 330 is executed; or if the state detection information of the material to be tested 1 does not have the preset segregation state information, the step 340 is executed.

In particular, the segregation state information is a state information indicating whether segregation occurs to the material to be tested 1, which is searched for and obtained from a database stored with the segregation state information.

It can be judged whether segregation or layering occurs to the material to be tested 1 by judging whether the state detection information of the material to be tested 1 has the preset segregation state information.

Step 330, a preset centrifugal rotation speed-increasing adjustment information is outputted and added to a centrifugal rotation detection control scheme to generate a new centrifugal rotation detection control scheme.

In particular, the centrifugal rotation speed-increasing adjustment information is an adjustment information used to control the control information of the rotation speed of the solid-liquid combination test component 2 to be speed-increasing adjusted, which is searched for and obtained from a database stored with the centrifugal rotation speed-increasing adjustment information.

When the state detection information of the material to be tested 1 has a preset segregation state information, it means that segregation layering occurs to the material to be tested 1 at current time. Therefore, the outputting preset centrifugal rotation speed-increasing adjustment information is added to the centrifugal rotation detection control scheme to generate the new centrifugal rotation detection control scheme, thereby improving the rotation speed of the solid-liquid combination test component 2, accelerating the segregation layering of the material to be tested 1, and improving a test efficiency of the durability.

Step 340, the step 400 is executed.

In particular, when the state detection information of the material to be tested 1 does not have a preset segregation state information, it means that segregation layering does not occur to the material to be tested 1. Therefore, the step 400 is jumped and executed.

Figure 10:
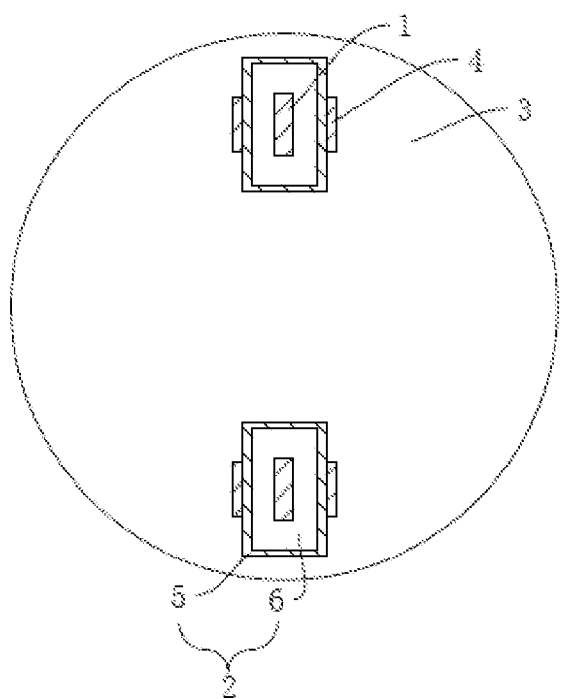
FIG. 10 is a sectional schematic view of a test device of the phase change material durability according to an embodiment in the present application.

Referring to FIG. 10, based on a same invention conception, the embodiment of the present application provides a test device of the phase change material durability including a solid-liquid combination test component 2, a driving assembly 3 and the temperature regulation semiconductor 4, in which the solid-liquid combination test component 2 is configured to detect the material to be tested 1, and includes a heat conduction solid and a heat conduction liquid 6 placed in the heat conduction solid, heat is accelerated for conduction by the heat conduction solid, and absorbed or released by the heat conduction liquid 6, such that, during the heating or cooling, the heat conduction solid is not easily to occur significant temperature change, and the temperature of the heat conduction solid distributes uniformly. The driving assembly 3 is configured to rotate the solid-liquid combination test component 2, so as to supply a centrifugal force for the material to be tested 1, and accelerate the material to be tested 1 to be layering, thereby improving a test efficiency of the durability. When the temperature regulation semiconductor 4 is working, one side of the temperature regulation semiconductor 4 adjacent to the solid-liquid combination test component 2 will heat or cool, and the other side of the temperature regulation semiconductor 4 will cool or heat by adding positive or negative voltage in two ends of the temperature regulation semiconductor 4. The temperature regulation semiconductors 4 are set as two, two temperature regulation semiconductors 4 are symmetrically mounted on outer side wall of two sides of a heat storage container 5, thereby improving the temperature regulation speed of the heat storage container 5, which is convenient to detect the durability of the material to be tested 1.

In the present application, the heat conduction solid is a heat storage container 5, which is convenient to detect the durability of the material to be tested 1 by placing the heat conduction liquid 6 and the material to be tested 1 in the heat storage container 5. The driving assembly 3 is a rotation disk, and the solid-liquid combination test component 2 is placed and fixed on the rotation disk. There are two solid-liquid combination test components 2 symmetrically provided around a circle center of the rotation disk, thereby improving the stability when the rotation disk rotates the solid-liquid combination test component 2.

Figure 11:
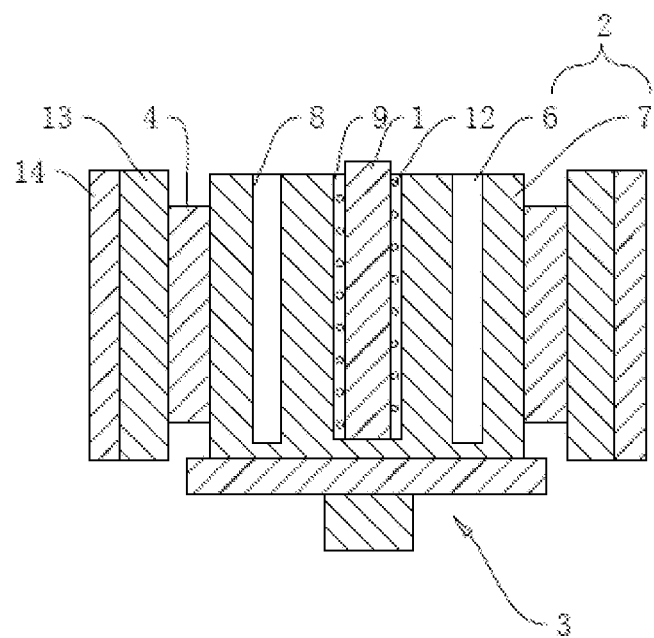
FIG. 11 is a sectional schematic view of a test device of the phase change material durability according to another embodiment in the present application.

Referring to FIG. 11, based on the same invention conception, the test device of the phase change material durability have another embodiment, the difference of which is as follows: the heat conduction solid is a test block 7, one side of the test block 7 departed from the driving assembly 3 defines a liquid-placing groove 8 configured to place the heat conduction liquid 6 and a detection groove 9 configured to place the material to be tested 1, the detection groove 9 is located in the middle position of the test block 7, the liquid-placing groove 8 is uniformly distributed around the detection groove 9 at equal angles. A cooling fin 13 is mounted on one side of the temperature regulation semiconductor 4 departed from the test block 7, the cooling fan 14 is mounted on one side of the cooling fin 13 departed from the temperature regulation semiconductor 4, the heat on the temperature regulation semiconductor 4 is conducted by the cooling fin 13, and the connection area between the air and the temperature regulation semiconductor 4 is increased. The heat dissipation speed of the cooling fin 13 is increased by the cooling fan 14, thereby improving a work efficiency of the temperature regulation semiconductor 4. The temperature regulation semiconductor 4 has advantages over other traditional cooling device in refrigeration, however, the temperature regulation semiconductor 4 has low efficiency in heating, such that a heater wire 12 is sleeved on the material to be tested 1, the heating speed is increased by the heater wire 12. A power source is connected to the temperature regulation semiconductor 4 and the heater wire 12 in a parallel connection way, the electrical control direction of the diode connected between the temperature regulation semiconductor 4 and the power source is opposite to the electrical control direction of the diode connected between the heater wire 12 and the power source, such that, when the temperature regulation semiconductor 4 is powered to work, the heat wire is not powered to work, and when the heater wire 12 is powered to work, the temperature regulation semiconductor 4 is not powered to work.

Figure 12:
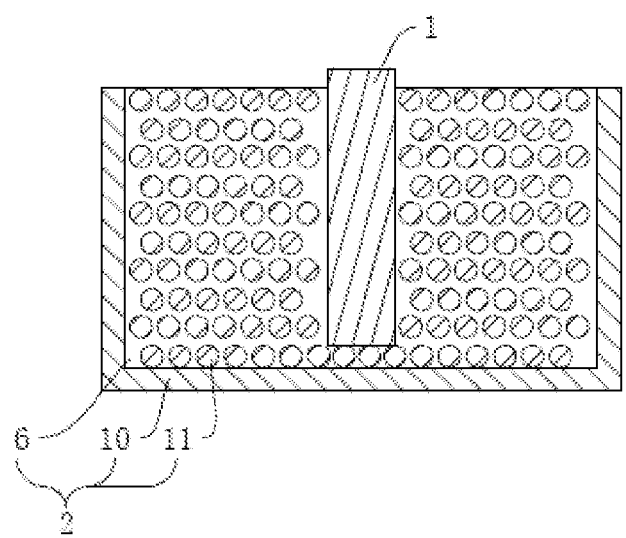
FIG. 12 is a sectional schematic view of a solid-liquid combination test component according to an embodiment in the present application.

Referring to FIG. 12, based on the same invention conception, the test device of the phase change material durability has another embodiment, the difference of which is as follows: the heat conduction solid is a test box 10 with a preset cavity, and the test box 10 is configured to place the heat conduction liquid 6 and a metal ball 11. During the test, the material to be tested 1 is placed at the center of the test box 10, such that the material to be tested 1 is convenient to be uniformly heated.

Figure 13:
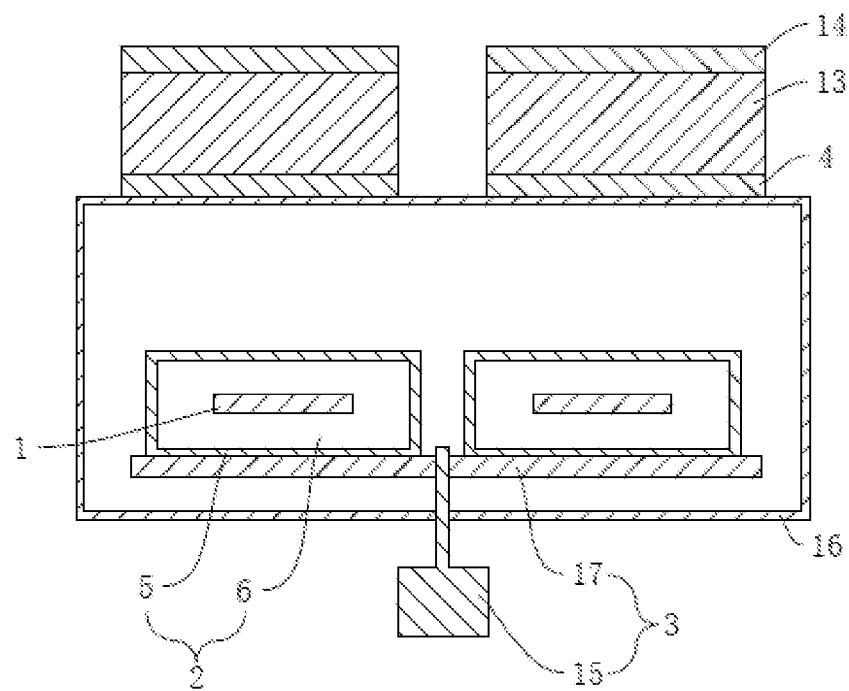
FIG. 13 is a sectional schematic view of the test device of the phase change material durability according to another embodiment in the present application.

Referring to FIG. 13, based on the same invention conception, the test device of the phase change material durability has another embodiment, the difference of which is as follows: the driving assembly 3 includes a placing connecting rod 17 configured to place and fix the solid-liquid combination test component 2 and a driving motor 15 configured to rotate the placing connecting rod 17, the middle of the placing connecting rod 17 along the length direction is mounted on a driving shaft of the driving motor 15, the solid-liquid combination test component 2 is positioned on one side of the placing connecting rod 17 departed from the ground, a centrifugal warehouse 16 configured to isolate the placing connecting rod 17 and the solid-liquid combination test component 2, the temperature regulation semiconductor 4 is mounted on one side of the centrifugal warehouse 16 departed from the driving motor 15, the cooling fin 13 is mounted on one side of the temperature regulation semiconductor 4 depart from the centrifugal warehouse 16, and the cooling fan 14 is mounted on one side of the cooling fin 13 departed from the temperature regulation semiconductor 4. The solid-liquid combination test component 2 is isolated by the centrifugal warehouse 16, such that, when the temperature regulation semiconductor 4 is working, the work state of the temperature regulation semiconductor 4 departed from the centrifugal warehouse 16 is not easily to affect the solid-liquid combination test component 2, thereby improving the work efficiency of the temperature regulation semiconductor 4 adjacent to the centrifugal warehouse 16. For example, when one side of the temperature regulation semiconductor 4 adjacent to the centrifugal warehouse 16 is heated, and the other side of the temperature regulation semiconductor 4 departed from the centrifugal warehouse 16 is cooled, since the distance between the side of the temperature regulation semiconductor 4 departed from the centrifugal warehouse 16 and the side of the temperature regulation semiconductor 4 adjacent to the centrifugal warehouse 16 is relative short, the heat cross is easy to be generated, which leads to that the side of the temperature regulation semiconductor 4 departed from the centrifugal warehouse 16 is easy to affect the side of the temperature regulation semiconductor 4 adjacent to the centrifugal warehouse 16, at this time, the side of the temperature regulation semiconductor 4 adjacent to the centrifugal warehouse 16 directly heats the centrifugal warehouse 16 and the solid-liquid combination test component 2 therein by the centrifugal warehouse 16, and the side of the temperature regulation semiconductor 4 departed from the centrifugal warehouse 16 dissipates the heat in the air out of the outer portion of the centrifugal warehouse 16, thereby improving a work efficiency of the temperature regulation semiconductor 4.

In the present application, the solid-liquid combination test component 2, the cooling fin 13 and the cooling fan 14 are regarded as a group and a number of the group is set as two, two groups are symmetrically provided at the central axis of the centrifugal warehouse 16 along the vertical direction, thereby improving a work efficiency of heating or cooling the centrifugal warehouse 16.

Figure 14:
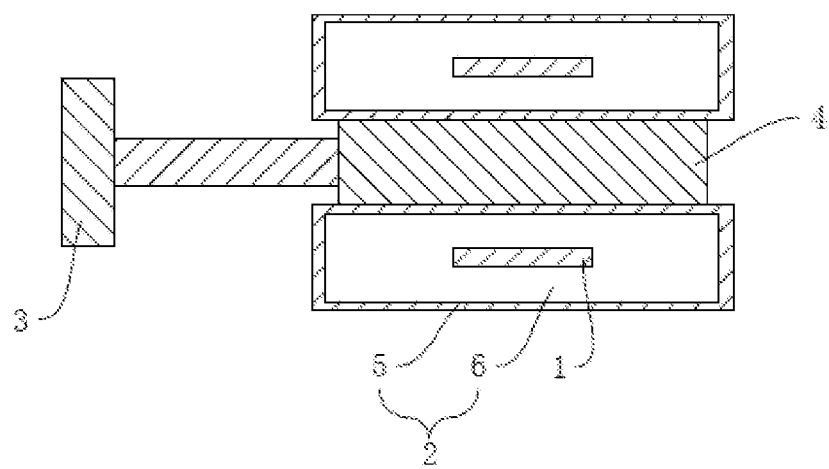
FIG. 14 is a sectional schematic view of the test device of the phase change material durability according to another embodiment in the present application.

Referring to FIG. 14, based on the same invention conception, the test device of the phase change material durability have another embodiment, the difference of which is as follows: the temperature regulation semiconductor 4 is mounted on the driving assembly 3, the driving assembly 3 rotates the temperature regulation semiconductor 4, in which the solid-liquid combination test components 2 are set as two, two solid-liquid combination test components 2 are respectively mounted on two sides of the temperature regulation semiconductor 4, such that, when the temperature regulation semiconductor 4 is working, the work characteristics that the two sides of the temperature regulation semiconductor 4 are respectively heated or cooled is fully used, two solid-liquid combination test components 2 suffer from opposite test temperature in same time, thereby reducing the power waste generated from the heat dissipation, and improving an utility efficiency of the electrical power.

Based on the same invention conception, a test system of a phase change material durability according to the embodiment of the present application, including:

an obtaining module configured to obtain a temperature detection information, a temperature regulation baseline curve information, a regulation temperature detection value, a current time point and a state detection information of the material to be tested 1;

a memory configured to store any one of program of the test method of the phase change material durability shown in FIGS. 1-5 and 7-9; and a processor configured to load with and execute the program in the memory and accomplish any one of the test method of the phase change material durability shown in FIGS. 1-5 and 7-9.

Those skilled in the art can clearly understand that, for the purpose to illustrate clear and simple, the division of above each of the functional module is exemplified, in the present application, the above function can be assigned to be completed by different function module according to the requirement, the internal structure of the device is divided into different functional module, to complete above all or part of function described above. The specification work processes of the system, the device and the unit described above, which can refer to the relative process in the above method embodiment, are not repeated herein.

The above embodiments are all relative good embodiments, and not a limitation of the protection range of the present application. Any one of characteristic disclosed in the present description (including abstract and figures), excepting special description, can be replaced by the replacement characteristic having same effect or similar objective. It means that, excepting special description, each characteristic is only an example of a serial of same effective characteristic or similar characteristic.

LIST OF REFERENCE SIGNS 1 material to be tested
2 solid-liquid combination test component
3 driving assembly
4 temperature regulation semiconductor
5 heat storage container
6 heat conduction liquid
7 test block
8 liquid-placing groove
9 detection groove
10 test box
11 metal ball
12 heater wire
13 cooling fin
14 cooling fan
15 driving motor 16 centrifugal warehouse
17 placing connecting rod

What is claimed is:

1. A durability test method of a phase change material, comprising:

placing a material to be tested in a solid-liquid combination test component configured to detect the material to be tested, and executing a preset centrifugal rotation detection control scheme;

performing a cycling control on a temperature regulation semiconductor provided on the solid-liquid combination test component according to a preset temperature single-cycle regulation scheme;

acquiring temperature detection information of the material to be tested; and analyzing and processing the temperature detection information of the material to be tested to generate durability information of the material to be tested according to a preset durability analysis method of the material to be tested;

wherein the preset temperature single-cycle regulation scheme comprises:

acquiring temperature regulation baseline curve information;

retrieving an initial regulation temperature value, a final regulation temperature value, electrical duty ratio information and electrical control frequency information corresponding to the temperature regulation baseline curve information according to the temperature regulation baseline curve information, and sending the initial regulation temperature value, the final regulation temperature value, the electrical duty ratio information and the electrical control frequency information to the temperature regulation semiconductor;

real-time acquiring of a regulation temperature detection value; and analyzing and obtaining regulation temperature correction information corresponding to the regulation temperature detection value and a regulation temperature baseline value according to a corresponding relationship among the regulation temperature detection value, a preset regulation temperature baseline value and preset regulation temperature correction information, and sending the regulation temperature correction information to the temperature regulation semiconductor;

wherein analyzing and processing the temperature detection information of the material to be tested to generate the durability information of the material to be tested according to the preset durability analysis method of the material to be tested comprises:

judging whether a single temperature single-cycle regulation scheme has been executed;

when the single temperature single-cycle regulation scheme has been executed, analyzing and processing the regulation temperature detection value to generate regulation temperature detection curve information according to a preset temperature curve confirmation method;

analyzing and processing the regulation temperature detection curve information to generate a regulation temperature current power storage value according to a preset regulation temperature current power storage value analysis method;

analyzing and obtaining a final deterioration speed value corresponding to the regulation temperature current power storage value according to a corresponding relationship between the regulation temperature current power storage value and a preset final deterioration speed value, and using the final deterioration speed value as the durability information of the material to be tested; and when the single temperature single-cycle regulation scheme has not been finished, continuously executing the single temperature single-cycle regulation scheme;

wherein analyzing and obtaining the final deterioration speed value corresponding to the regulation temperature current power storage value according to the corresponding relationship between the regulation temperature current power storage value and the preset final deterioration speed value comprises:

judging whether it is a first time to acquire the regulation temperature current power storage value;

when it is the first time to acquire the regulation temperature current power storage value, using the regulation temperature current power storage value as a regulation temperature initial power storage value;

re-executing the single temperature single-cycle regulation scheme;

when it is not the first time to acquire the regulation temperature current power storage value, analyzing and processing the regulation temperature current power storage value to generate a deterioration ratio value according to a preset deterioration ratio value determination method; and analyzing and processing the deterioration ratio value to generate a current deterioration speed value according to a preset deterioration speed value confirmation method, and using the current deterioration speed value as the final deterioration speed value, and wherein analyzing and processing the deterioration ratio value to generate the current deterioration speed value according to the preset deterioration speed value confirmation method comprises:

judging whether the current deterioration speed value is smaller than a preset deterioration speed baseline value;

when the current deterioration speed value is smaller than the preset deterioration speed baseline value, continuously outputting the current deterioration speed value; and when the current deterioration speed value is not smaller than the preset deterioration speed baseline value, re-executing the single temperature single-cycle regulation scheme.

2. The durability test method of the phase change material according to claim 1, further comprising, after acquiring the temperature detection information of the material to be tested and before analyzing and processing the temperature detection information of the material to be tested to generate the durability information of the material to be tested according to the preset durability analysis method of the material to be tested:

acquiring state detection information of the material to be tested;

judging whether the state detection information of the material to be tested has preset segregation state information;

when the state detection information of the material to be tested has the preset segregation state information, outputting and adding preset centrifugal rotation speed-increasing adjustment information to a centrifugal rotation detection control scheme to generate a new centrifugal rotation detection control scheme; and when the state detection information of the material to be tested does not have the preset segregation state information, analyzing and processing the temperature detection information of the material to be tested according to the preset durability analysis method of the material to be tested to generate the durability information of the material to be tested.

3. The durability test method of the phase change material according to claim 1, further comprising, after sending the regulation temperature correction information to the temperature regulation semiconductor:

analyzing and calculating a difference between the initial regulation temperature value and the final regulation temperature value as a regulation temperature variation value according to the initial regulation temperature value and the final regulation temperature value;

judging whether the regulation temperature variation value is a positive value;

when the regulation temperature variation value is the positive value, outputting preset auxiliary heating control information into an auxiliary heating component provided on the solid-liquid combination test component; and when the regulation temperature variation value is not the positive value, continuously sending the regulation temperature correction information to the temperature regulation semiconductor.

4. The durability test method of the phase change material according to claim 3, further comprising, after continuously sending the regulation temperature correction information to the temperature regulation semiconductor:

acquiring a current time point;

analyzing and processing the temperature regulation baseline curve information at the current time point to generate a baseline time temperature prediction value according to a preset temperature prediction method; and analyzing and obtaining pre-cooling control information corresponding to the baseline time temperature prediction value according to a corresponding relationship between the baseline time temperature prediction value and preset pre-cooling control information, and sending the pre-cooling control information to a cooling fan provided on the temperature regulation semiconductor.

5. A durability test device of a phase change material used with the durability test method of the phase change material according to claim 1, comprising the solid-liquid combination test component configured to detect the material to be tested, a driving assembly configured to rotate the solid-liquid combination test component, and the temperature regulation semiconductor configured to regulate a temperature of the material to be tested, wherein the solid-liquid combination test component comprises a heat conduction solid and a heat conduction liquid.

6. A durability test system of a phase change material used with the durability test method of the phase change material according to claim 1, comprising:

an acquiring module configured to acquire the temperature detection information, the temperature regulation baseline curve information, the regulation temperature detection value, a current time point and state detection information of the material to be tested;

a memory configured to store a program of the durability test method of the phase change material; and a processor configured to execute the program stored in the memory to perform the durability test method of the phase change material based on the temperature detection information, the temperature regulation baseline curve information, the regulation temperature detection value, the current time point and the state detection information of the material acquired by the acquiring module.

\* \* \* \* \*